United States Patent [19]

Huhn et al.

[11] Patent Number: 4,895,321

[45] Date of Patent: Jan. 23, 1990

[54] HELICOPTER TRUCK DOLLY

[76] Inventors: John Huhn, c/o George Spector, 3615 Woolworth Bldg., 233 Broadway; George Spector, c/o John Huhn, 3615 Woolworth Bldg., 233 Broadway, both of New York, N.Y. 10007

[21] Appl. No.: 384,092

[22] Filed: Jun. 1, 1982

[51] Int. Cl.$^4$ .............................................. B64C 1/22
[52] U.S. Cl. ................................... 244/118.2; 244/120
[58] Field of Search ............... 244/118.1, 118.2, 137.1, 244/17.11, 120, 140, 108

[56] References Cited

U.S. PATENT DOCUMENTS

| 2,075,042 | 3/1937 | Knerr | 244/118.2 |
| 2,294,003 | 8/1942 | Scheufele | 244/118.2 |
| 2,388,380 | 11/1945 | Bathurst | 244/118.2 |
| 2,448,862 | 9/1948 | Conklin | 244/118.2 |
| 3,176,940 | 4/1965 | Echeverria, Jr. | 244/118.1 |
| 4,026,502 | 5/1977 | Masclef | 244/108 |

FOREIGN PATENT DOCUMENTS 566915 5/1958 Belgium ........................... 244/118.1

*Primary Examiner*—Galen L. Barefoot

[57] ABSTRACT

A helicopter removable container assembly is provided and consists of a container, a means for securing the container to the rear end of a helicopter fuselage whereby the container forms a continuation of the helicopter fuselage when attached thereto and a vehicle for transporting the container when the container is removed from the helicopter fuselage.

2 Claims, 1 Drawing Sheet

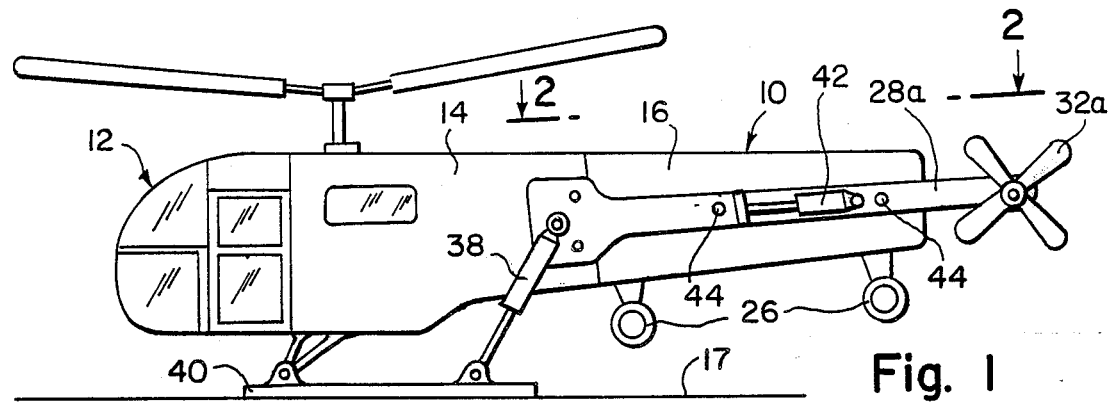
Fig. 1
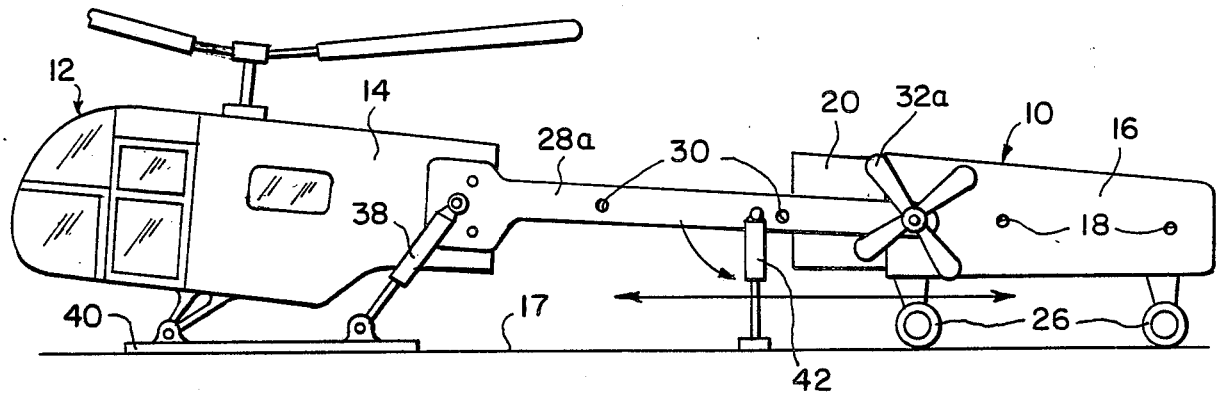
Fig. 3
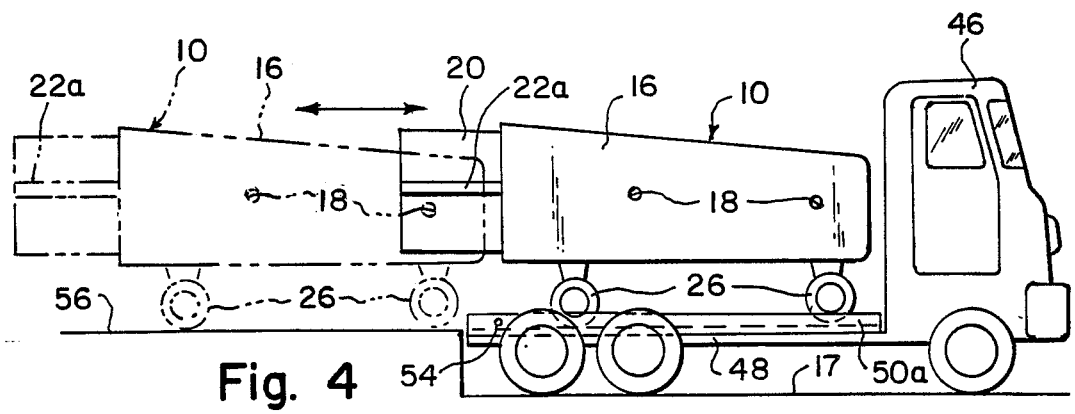
Fig. 4
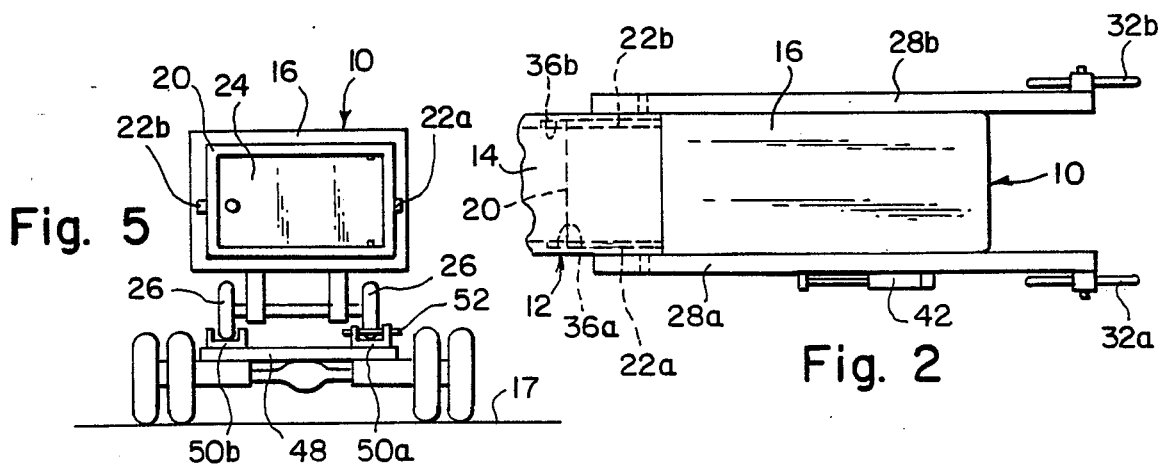
Fig. 5
Fig. 2

HELICOPTER TRUCK DOLLY

BACKGROUND OF THE INVENTION

The instant invention relates generally to wheeled containers and more specifically it relates to a helicopter removable container assembly.

It is a known fact that transferring freight between helicopters and trucks is a slow, tedious job, that must be done by individual handling. This method is time consuming and accordingly this situation is in need of an improvement.

SUMMARY OF THE INVENTION

A principle object of the present invention is to provide a helicopter removable container assembly whereby a container forms a continuation of a helicopter fuselage when attached to its rear end.

Another object is to provide a helicopter removable container assembly whereby freight can be quickly transferred between helicopter and truck at a freight terminal and wherein the transfer is more rapidly accomplished by transferring the loaded container instead of unloading the freight therefrom.

A further object is to provide a helicopter removable container assembly that has a container which can be wheeled directly across an airport ground surface between a helicopter and truck, and which can be wheeled onto rails upon the truck bed.

A still further object is to provide a helicopter removable container assembly that has a container which can be rolled upon a railroad flat bed car that is equipped with rails for the wheels of the container to ride thereupon.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawing are briefly described as follows:

FIG. 1 is a side view of a helicopter with a container attached.

FIG. 2 is a partial top view taken along line 2-2 in FIG. 1.

FIG. 3 is a similar view of FIG. 1 with the container detached so that it can be rolled away.

FIG. 4 is a side view of a truck for transporting the container and showing the container in phantom rolled upon a freight dock.

FIG. 5 is a rear end view of the truck and container.

DETAILED DESCRIPTION OF THE PREFERRED EMBODIMENT

Turning now descriptively to the drawings, in which similar reference characters denote similar elements throughout the several views, FIGS. 1, 2 and 3 illustrate a container 10 that can be secured to the rear end of a helicopter 12 whereby the container 10 forms a continuation of the helicopter fuselage 14 when attached thereto.

The container 10 includes a storage compartment 16 having a plurality of transverse threaded bolt holes 18 in opposite side walls. A sleeve 20 is affixed to the open end of the storage compartment 16 and a pair of guides 22a and 22b are horizontal and transversely affixed to the outer surface of the sleeve 20. A door 24 is placed across the open end of the storage compartment 16 (see FIG. 5) and a plurality of rubber wheels 26 are mounted to the bottom of the storage compartment 16, so to be smoothly rolled across a ground surface 17. The container 10 may or may not be made equipped with its own engine for powering its movement across the ground surface 17. As shown in FIG. 1, the container 10 is shaped to form a streamlined assembly with the helicopter fuselage 14 for flight in the air.

In the design illustrated, the helicopter 12 includes a pair of rearwardly extending parallel booms 28a and 28b each one having a plurality of bolt holes 30 and affixed at one end to the helicopter fuselage 14 for the container 10 to travel therebetween. The booms 28a and 28b each have a steadying propeller 32a and 32b at its rear end in conventional manner.

A pair of guide tracks 36a and 36b horizontal and transversely are affixed to the inner surface of the helicopter fuselage 14 so that the guides 22a and 22b will position and allow the sleeve 20 of the container 10 to enter the helicopter fuselage when the container 10 is rolled between the booms 28a and 28b as shown in FIG. 2.

A first hydraulic jack 38 extends between the rear end of runners 40 and rear of the helicopter fuselage 14 to support the helicopter 12 when securing the container 10. A second hydraulic jack 42 is pivotally affixed to the middle of boom 28a that extends to the ground surface 17 for additional support for the helicopter 12 when securing the container 10.

A plurality of bolts 44 are provided, each bolt 44 is engagable in each corresponding bolt hole 30 in each of the rearwardly extending booms 28and 28and each corresponding threaded bolt hole 18 in the side wall of the storage compartment 16. The height of the holes 30 and 18 must be at the same elevation above the ground surface 17 for respective alignment by lifting or lowering the booms 28a and 28b when making the attachment. The first hydraulic jack 38 and second hydraulic jack 42 will perform this function when adjustment is necessary.

FIGS. 4 and 5 shows the container 10 on a truck 46 with a flat bed 48. A pair of channel shaped rails 50a and 50b are spaced apart and mounted upon the flat bed 48 so that the wheels 26 of the container 10 can ride thereupon. A pin 52 is placed through a pair of transverse holes 54 in the channel 50after the container 10 is placed onto the truck 46 to prevent the wheels 26 from rolling off the truck 46. FIG. 4 also shows the container 10 in phantom rolled upon a freight dock 56.

Instead of using the truck 46, the container 10 can be rolled upon a railroad flat bed car (not shown) that is equipped with the rails 50a and 50b for the wheels 26 of the container 10 to ride thereupon.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A helicopter removable container assembly, comprising in combination:
   (A) a container;
   (B) Means for securing said container to rear end of a helicopter fuselage whereby said container forms a continuation of said helicopter fuselage when attached thereto;
   (C) a vehicle for transporting said container when said container is removed from said helicopter fuselage wherein said container further comprises:
   (d) a storage compartment having a plurality of transverse threaded bolt holes in opposite side walls;
   (e) a sleeve affix®d to open end of said storage compartment;
   (f) a pair of guides horizontal and transversely affixed to outer surface of said sleeve;
   (g) a door placed across said open end of said storage compartment;
   (h) a plurality of wheels mounted to bottom of said storage compartment, wherein said means for securing said container to rear end of helicopter fuselage comprises:
   (i) a pair of rearwardly extending parallel booms each one having a plurality of bolt holes and affixed at one end to said helicopter fuselage for said container to travel therebetween;
   (j) a pair of guide tracks horizontal and transversely affixed to inner surface of said helicopter fuselage so that said guides will position and allow said sleeve of said container to enter said helicopter fuselage;
   (k) first hydraulic jack extending between rear end of runners and rear of said helicopter fuselage to support helicopter when securing said container;
   (l) second hydraulic jack pivotally affixed to middle of said boom that extends to ground surface for additional support for said helicopter when securing said container; and
   (m) a plurality of bolts each bolt engageable in each corresponding said bolt hole in each of said rearwardly extending booms and each corresponding said threaded bolt hole in said side wall of said storage compartment.

2. A helicopter removable container assembly as recited in claim 1 wherein said vehicle further comprises:
   (a) a truck with flat bed;
   (b) a pair of channel shaped rails with one having a pair of transverse holes, spaced apart and mounted upon said flat bed so that said wheel of said container can ride thereupon; and
   (c) a pin placed through said pair of transverse holes in said channel after said container is placed onto said truck so that said pin prevents said wheels from rolling off said truck.

* * * * *